United States Patent [19]

Upshaw

[11] 4,084,832
[45] Apr. 18, 1978

[54] SHOPPING CART WITH ANTI-PILFERAGE CHARACTER

[75] Inventor: Clarence Ward Upshaw, Tuttle, Okla.

[73] Assignee: Unarco Industries, Inc., Chicago, Ill.

[21] Appl. No.: 711,856

[22] Filed: Aug. 5, 1976

[51] Int. Cl.² ............................................. B62B 11/00
[52] U.S. Cl. ......................... 280/33.99 S; 280/DIG. 4
[58] Field of Search ................ 280/33.99 R, 33.99 A, 280/33.99 S, 33.99 F, 33.99 H, DIG. 4; 186/1 AC; D12/21, 30, 25

[56] References Cited

U.S. PATENT DOCUMENTS

| D. 155,971 | 11/1949 | Concklin | 280/33.99 S |
|---|---|---|---|
| D. 164,488 | 9/1951 | Goldman | 280/DIG. 4 |
| D. 190,279 | 5/1961 | Hummer | 280/33.99 R |
| 2,689,132 | 9/1954 | Kahn | 280/33.99 H |
| 3,039,783 | 6/1962 | Stanley | 280/33.99 H |
| 3,078,102 | 2/1963 | Sides | 280/33.99 H |
| 3,829,114 | 8/1974 | Cohen et al. | 280/33.99 R |
| 3,844,577 | 10/1974 | Wahl | 280/33.99 R |

*Primary Examiner*—David M. Mitchell
*Attorney, Agent, or Firm*—Norman Lettvin

[57] ABSTRACT

An improved frame construction for a wheeled, nestable shopping cart is provided by forming the greater portion of the cart's underframe from two U-shaped members that are shaped, arranged and interconnected to provide by one of the U-shaped members a basket support and legs to which the rear wheels secure, and by the second U-shaped member being employed to rigidify the basket support and the legs for the rear wheels, and being inclined forwardly from the basket support to provide mount means for the front casters while providing a shape and arrangement that frustrates use thereof for supporting goods thereon.

2 Claims, 4 Drawing Figures

SHOPPING CART WITH ANTI-PILFERAGE CHARACTER

FIELD OF INVENTION

This invention relates to a nestable shopping cart's underframe that is provided with anti-pilferage character in that it is so constructed as to substantially frustrate using the cart as a means for effecting pilferage.

BACKGROUND OF THE INVENTION

Pilferage of goods from supermarkets is a major cause of economic loss by the supermarket. Since baskets of shopping carts are usually maintained spaced above the wheeled portion of the cart's underframe, the region below the shopping cart's basket naturally lends itself to storage of merchandise therein that could be overlooked by check-out personnel of the supermarket. U.S. Pat. No. 3,829,114 discloses one typical attempt to frustrate use of the region below a shopping cart's basket to prevent pilferage. The structure of that patent is relatively expensive in that it relies upon adding a plurality of inclined struts, as an obstructing means, to a standard underframe of existing carts.

The object of this invention is to reduce the cost of an anti-pilferage cart construction by providing an improved frame construction for a nestable shopping cart that is characterized by its effectiveness in frustrating under-the-basket storage of merchandise and by its economy of manufacture.

Another object of this invention is to provide an improved and simplified frame construction for a shopping cart that has both nesting and anti-pilferage character, and wherein the support for the forwardly cantilevered basket of the cart, and the mount for the rear wheels of the cart, are both rigidified by simplified use of only two U-shaped tubular members that are welded together.

Further object and advantages of the invention herein will become evident as this description proceeds.

BRIEF DESCRIPTION OF THE INVENTION

The frame of a nestable shopping cart beneath the goods-carrying basket is defined principally by use of only two U-shaped tubular members, of circuit exterior cross-section, the legs of each of the two members being welded to a leg of the other member at two spaced points to provide increased rigidity for the cart's frame, while defining a generally planar basket support, rigidified mounts for the two rear wheels of the cart, an anti-pilferage frame shape, and means to which the front casters of the cart may be secured.

DETAILED DESCRIPTION OF THE PREFERRED EMBODIMENT OF THE INVENTION

Figure 1:
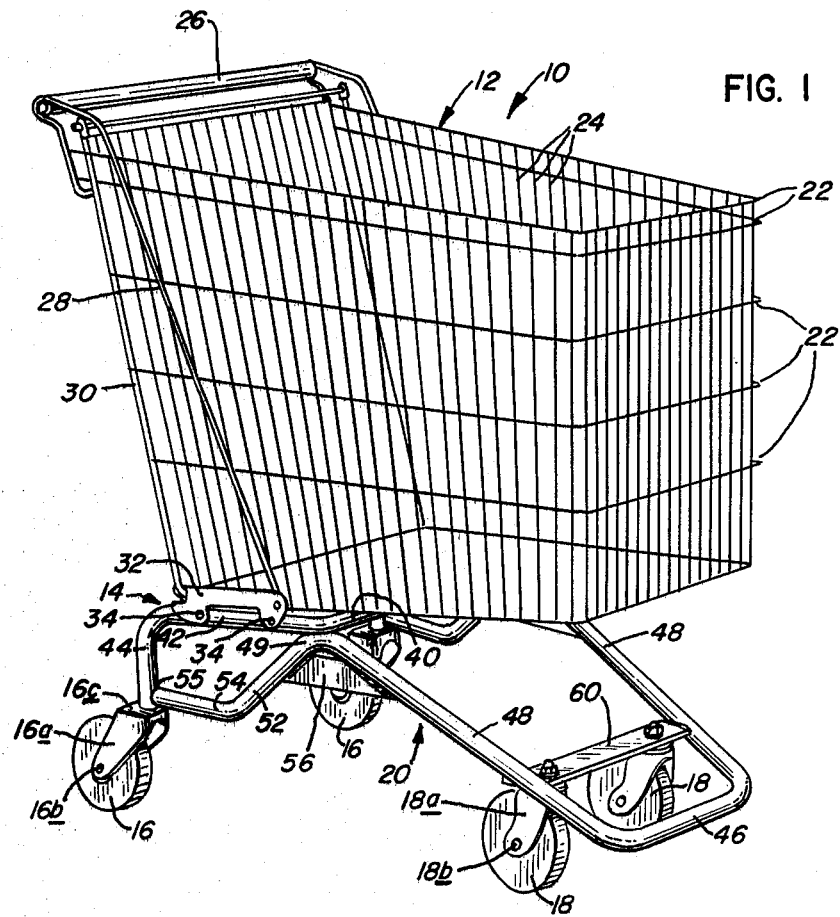
FIG. 1 is a perspective view of a nestable shopping cart provided with the improved underframe of this invention.

Referring now to the drawings, FIG. 1 illustrates a nestable shopping cart embodying the improved underframe of this invention. The cart, generally indicated at 10, includes a wire basket 12 seated atop the cart's underframe, generally 14, that is equipped with a pair of rear wheels 16, a pair of front casters 18, and the improved frame, generally 20.

The wire basket is of well-known construction and, for example, is shown as formed by a series of generally horizontal, vertically spaced, frame wires 22 welded to a grid of vertical U-shaped wires 24 that define the upright sides and grid-like bottom wall of the cart. Such baskets are frequently provided with means adjacent the rear upright wall serving as a child's seat structure, but illustration thereof has been omitted as it is standard construction as is well known in the art. The rear end of the goods-carrying basket 12 also shows the typical handle bar 26, heavy frame wires 28 and 30, and side plates 32. The side plates 32 frame lower portions of opposite side walls of the basket 12, have notched portions for cooperation with wires 28 and 30, and provide depending ears that are intended to embrace basket-support portions of the underframe, to be secured thereto by bolt means 34, all as well known in the art.

The improved frame 20 is formed by only two U-shaped tubular steel members, the first generally at 36, the second generally at 38. The first U-shaped member 36 is shaped and arranged to provide a generally planar basket support means, having a slight incline forwardly and upwardly, as shown, the support means including the bight 40 and adjacent rearwardly and downwardly extending leg portions 42. The leg portions 42 each are pierced diametrically at 43 to provide apertures for receiving therethrough the stems of bolt means 34. The rear end of each leg portion 42 is bent through a rounded elbow to extend vertically downwardly to define upright, and preferably vertical, mount legs 44, distal from bight 40, for the cart's rear wheels 16. Each rear wheel 16 is provided as a sub-assembly that includes a U-shaped bracket shaped to provide spaced ears 16a, in which are journalled the ends of wheels axle 16b, and a bight 16c with a flat upper surface to which the terminus of a mount leg 44 secures through means such as the circumferential weld 45.

Figure 2:
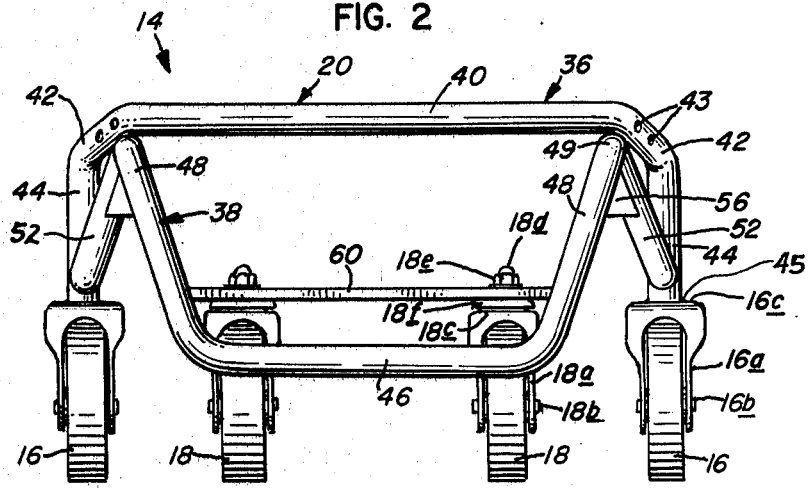
FIG. 2 is a front elevational view of the cart's underframe.
Figure 3:
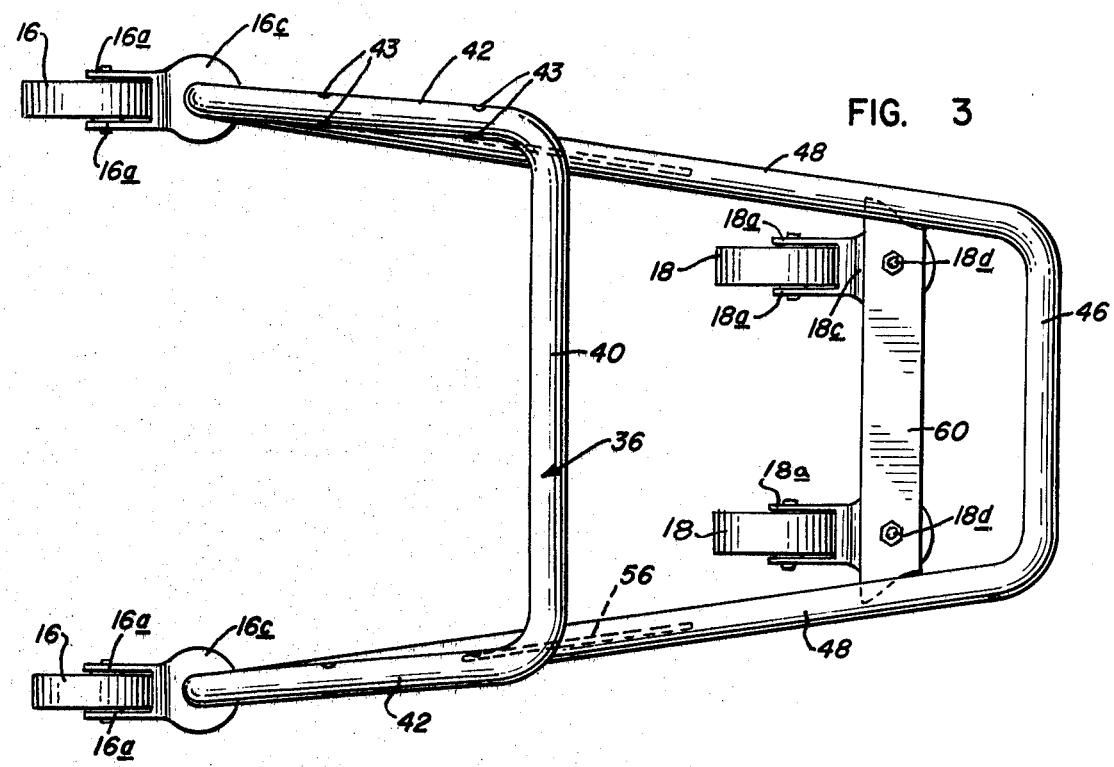
FIG. 3 is a top plan view of the underframe shown in FIG. 2.
Figure 4:
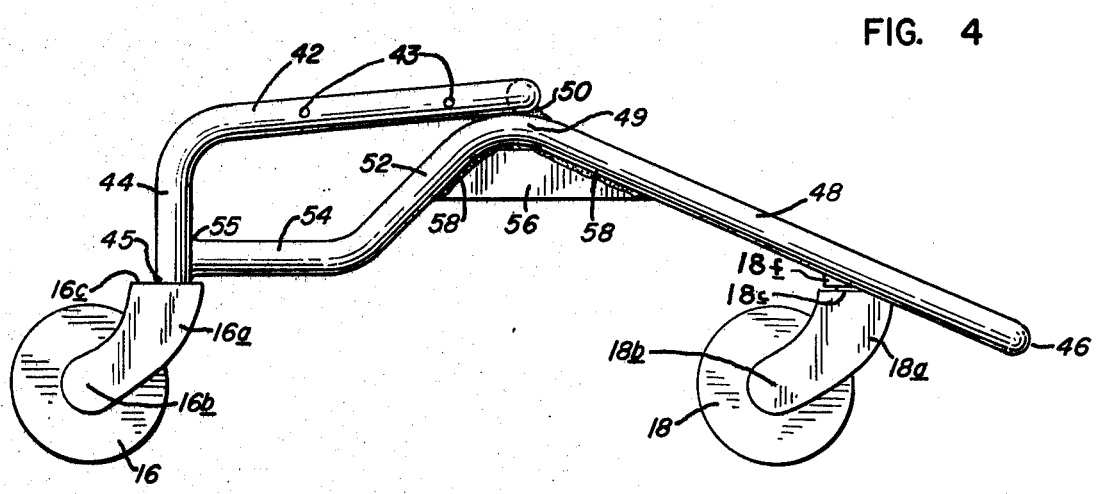
FIG. 4 is a side elevational view of the underframe taken looking from a position to the left of FIG. 2.

The second U-shaped tubular member 38 has its bight 46 at the toe, or forward, end of the cart, as the lowest portion of frame 20 and spaced below the plane of the basket support means. The elongated legs of U-member 38 are shaped and arranged for rigidifying both the basket support means of the first member 36 and the mount legs 44 for the rear wheels 16. The elongated legs of U-member 38 each provide, adjacent bight 46, a portion 48 extending both rearwardly and outwardly of bight 46. As seen in FIG. 2, the bight 46 is of smaller length than bight 40 of the first U-member, thereby providing the desired taper for the frame 20 to permit ready nesting of carts. The leg portions 48 extend rearwardly in diverging manner, inclining upwardly to uppermost elbows 49 immediately adjacent and below the lateral ends of the bight 40 of the first U-member 36. The elbows 49 are welded at 50 to the bight 40 thereabove, to effect bracing and rigidification of the forwardmost portion of the basket support means. Rearwardly of the elbows 49, the legs of U-member 38 incline downwardly and rearwardly first to provide diverging sections 52, and then turn substantially horizontally to provide sections 54 whose termini are welded at 55 to mount legs 44 adjacent bight 16c of the wheel sub-assembly, thereby to rigidify the distal ends of mount legs 44, against tendency to spread, or bend away from vertical, both laterally and longitudinally.

The elbow 49 in each leg of U-shaped member 38 is reinforced by an elongated gusset plate 56, that lies in the vertical plane defined by leg sections 48 and 52 and is welded at its ends, as shown at 58, to said leg sections 48 and 52.

An elongated, flat, support member 60, spaced substantially parallel to, but rearwardly of and above bight 46 is welded at its ends to the leg portions 48, and has front casters 18 replaceably secured thereto. The casters 18 are sub-assemblies that each include a U-shaped bracket 18a whose spaced ears journal the ends of wheel axle 18b, and whose bight 18c has a threaded mounting stud 18d extending upwardly therefrom for securement to support member 60 through nut 18e. The casters 18 are provided with appropriate swivel character, as is well known in the art, by use of a bearing member 18f interposed between bight 18c and support member 60.

From the foregoing it will be understood that tubular frame 20 of underframe 14 is inexpensively formed of only two U-shaped members 36 and 38, each of said members being formed of a single length of steel tubing. The round cross-section of the tubing, and the spaced forward leg portions 48 that are inclined at a fairly steep angle to the horizontal between bight 46 and elbows 49, cooperate to prevent storage of goods on the forward portions of frame 20, thereby providing the cart frame with anti-pilferage character. Also, the rear portions of frame 20 including vertical mount legs 44, and leg portions 52 and 54 being of such a closely spaced nature, as shown, that they prevent storage of goods thereon or therebetween and cooperate to provide additional anti-pilferage character to the frame.

While one preferred embodiment of the invention has been shown and described, it will be understood by those skilled in the art that the features of the invention may be included in other embodiments, and it is the intention in the appended claims to cover the invention in its broadest aspects.

What is claimed is:

1. In an underframe for a wheeled, nestable, shopping cart that includes a goods-carrying basket supported on a generally planar basket support means that is operatively connected to but spaced above a pair of rear wheels and a pair of front casters, wherein said underframe includes a first U-shaped tubular member whose bight and adjacent portion of the legs of the U are shaped and arranged to provide the generally planar basket support means and with the portions of the legs of said first U-shaped member that are distal from the U's bight being formed to extend downwardly from said basket support means and terminating in laterally spaced upright legs positioned generally above the pair of rear wheels and to which said wheels connect; the improvement comprising, in combination:

a second U-shaped member with elongated, shaped legs constructed and arranged for directly supporting and rigidifying the upper planar basket support means of said first U-member and for providing lateral and longitudinal rigidification of the lower termini of said upright legs to which the pair of rear wheels connect, said second U-shaped member being shaped, arranged and disposed so that the bight of said second U-member is spaced forwardly of and below the basket support means, the legs of said second U-shaped member extending rearwardly and diverging outwardly from the ends of the second U-member's bight, and being arranged to incline upwardly and rearwardly from said bight to a point at which said legs directly engage and secure to the upper basket support means of the first U-member adjacent a forward portion thereof, said legs then inclining downwardly and rearwardly and being secured at their termini to the downwardly extending leg portions of the first U-shaped member adjacent the lower termini of the legs of the first U-shaped member to provide both lateral and longitudinal rigidification of the downwardly extending distal leg portions of said first U-shaped member.

2. A construction as in claim 1 wherein the portions of each of the legs of the second U-shaped member, which are adjacent the points of securement thereof to the basket support means, are rigidified by an elongated gusset plate positioned in the plane of the leg and secured at its ends to two adjacent leg segments, one of which inclines upwardly and rearwardly and the other inclined downwardly and rearwardly.

* * * * *